(12) United States Patent
Kim

(10) Patent No.: US 7,455,345 B1
(45) Date of Patent: Nov. 25, 2008

(54) SUNSHADE APPARATUS FOR AUTOMOBILES

(75) Inventor: Joon Hee Kim, Seoul-si (KR)

(73) Assignee: Korea Fuel-Tech Corporation, Ansung-si, Gyeonggi-do (KR)

( * ) Notice: Subject to any disclaimer, the term of this patent is extended or adjusted under 35 U.S.C. 154(b) by 0 days.

(21) Appl. No.: 11/954,561

(22) Filed: Dec. 12, 2007

(51) Int. Cl.
*B60J 3/00* (2006.01)

(52) U.S. Cl. ................ 296/97.4; 296/97.8; 160/370.22
(58) Field of Classification Search ................ 296/97.4, 296/97.8; 160/370.22
See application file for complete search history.

(56) References Cited

U.S. PATENT DOCUMENTS 6,216,762 B1   4/2001   Lin 6,427,751 B1 *   8/2002   Schlecht et al. ........ 160/370.22

* cited by examiner

*Primary Examiner*—Joseph D Pape
(74) *Attorney, Agent, or Firm*—Michael J. Striker

(57) ABSTRACT

The present invention relates to a sunshade apparatus for automobiles. In the apparatus, first and second linking rods, which function to stretch or close first and second arm units jointed to a shade bar, are actuated by first and second racks, which are engaged with motor-operated first and second drive pinions and are rectilinearly moved in opposite directions. Further, torsion springs are fitted over respective pivots, which joint the upper arm members of the first and second arm units to the shade bar, such that the torsion springs can promote the stretching of respective upper arm members. The torsion springs can be easily assembled in the apparatus, do not generate vibration or noises, and are light, thus reducing the power required to move the shade bar upwards or downwards. Therefore, the present invention realizes the smallness of the drive unit and the lightness of the sunshade apparatus.

2 Claims, 3 Drawing Sheets

SUNSHADE APPARATUS FOR AUTOMOBILES

BACKGROUND OF THE INVENTION

1. Field of the Invention

The present invention relates, in general, to sunshade apparatuses for automobiles and, more particularly, to a sunshade apparatus for automobiles, which is installed in an automobile at a location near a rear window and extends a sunshade screen from a winding roll using a motor, thus shading the interior of the automobile from sunlight.

2. Description of the Related Art

A motorized sunshade apparatus for automobiles is typically installed on a rear shelf, which is located between a rear seat and a rear window inside the passenger compartment of an automobile and has low structural strength. Due to the low structural strength of the rear shelf, the motorized sunshade apparatus must have characteristics in that it does not generate shocks or vibration at the time of starting or stopping operation, has light weight, and generates little operational noise, in addition to the requirement of high operational reliability.

U.S. Pat. No. 6,216,762 discloses a sun-shade device, in which a rotary plate is installed to be rotated clockwise and counterclockwise by a motor, and first and second linking rods are jointed at first ends thereof to the rotary plate at opposite locations angularly spaced apart from each other at an angle of 180 degree and actuate left and right arm units, respectively. In operation, the sun-shade device converts rotating motion of the rotary plate into rectilinear motions of the first and second linking rods, so that, at the time of starting and stopping the operation of the sun-shade device, the motions of the elements are delayed, and thus the operation of the sun-shade device may not be stable.

Further, in the sun-shade device, a stopping means, which prevents excessive rotation of upper and lower arm members of each arm unit and comprises a pin protrusion provided on the lower arm member and an engaging groove provided on the upper arm member, is provided. However, to provide the stopping means in the sun-shade device, it is necessary to produce a pin protrusion and fit the pin protrusion into a hole, which is formed in the lower arm member, or weld the pin protrusion to the lower arm member, thus complicating the process of producing the lower arm member having the pin protrusion. Further, it is necessary to form a precise engaging groove in the upper arm member at a location corresponding to the pin protrusion. Therefore, it is difficult to form reliable stopping means in the sun-shade device. Further, the pin protrusion and the engaging groove may be deformed and abraded partially after the stopping means is repeatedly used for a lengthy period of time. In the above state, the stopping means may generate operational noise, which irritates passengers, and may not realize desired operational precision.

The sun-shade device further includes biasing means, which is provided in a shade bar to elastically bias respective upper arm members of the left and right arm units and promote the rotating motion of the upper arm members relative to the shade bar, thus realizing easy stretching of the upper and lower arm members. The biasing means provided in the sun-shade device comprises a tension spring, both ends of which extend over the upper ends of respective upper arm members and are locked thereto, so that the tension spring is elongated and thus exceeds the length of the shade bar. Thus, it is difficult to assemble the tension spring in the sun-shade device.

Further, the tension spring, which is elongated to thus exceed the length of the shade bar, generates a metal scratching noise and vibration during the extension and contraction thereof. Thus, to reduce the noise and vibration, the tension spring must be covered with a covering, such as tape or a nonwoven fabric having sound and vibration absorption properties.

Further, the tension spring, which is elongated to exceed the length of the shade bar, increases the weight of the shade bar, thereby compromising the lightness of the sun-shade device. Because the tension spring increases the weight of the shade bar, it is necessary to use increased power to move the shade bar upwards or downwards, so that a drive unit capable of generating increased output power must be used.

SUMMARY OF THE INVENTION

Accordingly, the present invention has been made keeping in mind the above problems occurring in the related art, and the present invention is intended to propose a sunshade apparatus for automobiles, which easily stretches and winds a sunshade screen, has high operational reliability and high durability, generates lower levels of noise and vibration, and is light, thus being suitable for installation in an automobile on a rear shelf, which has a low structural strength.

In order to achieve the above object, according to one aspect of the present invention, there is provided a sunshade apparatus for automobiles comprising: a sunshade screen wound around a winding roll, the winding roll being installed inside a casing and being biased by an elastic member; a shade bar holding an edge of the sunshade screen; a first arm unit and a second arm unit, each comprising upper and lower arm members, the upper arm members of the first and second arm units being jointed to opposite ends of the shade bar using respective pivots, and the lower arm members being jointed to opposite ends of the casing using respective pivots and being jointed to the upper arm members using respective hinges; first and second linking rods jointed at first ends thereof to respective extension ends of the lower arm members using respective pivots; and a drive unit including a drive motor and moving the first and second linking rods in opposite directions, thus stretching or closing the first and second arm units and extending or winding the sunshade screen, wherein first and second racks are jointed to second ends of the first and second linking rods using respective pivots, and are movably inserted into a housing of the drive unit such that the racks can move in opposite directions without interference; the drive unit comprises: a small-diameter gear mounted to a shaft of a worm wheel engaged with a worm of a rotating shaft of the motor, and engaged with a large-diameter gear of a first output shaft; a first drive pinion mounted to the first output shaft and engaged with the first rack; and a second drive pinion mounted to a second output shaft and engaged both with the first drive pinion and with the second rack; and torsion springs are fitted over respective pivots, which joint the upper arm members of the first and second arm units to the shade bar, first ends of the torsion springs being locked to respective locking holes of the shade bar, and second ends of the torsion springs being caught by respective locking grooves of the upper arm members, so that the torsion springs can bias and stretch respective upper arm members outwards.

The sunshade apparatus may further comprise: a bent protrusion provided on a lower end of the upper arm member of each of the first and second arm units and comprising a cut surface and a bent surface; and an engaging groove formed on a side of an upper end of the lower arm member of each of the first and second arm units such that the engaging groove can be engaged with the cut surface of the bent protrusion, thus preventing excessive rotation of the upper and lower arm members when the first and second arm units are fully stretched.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
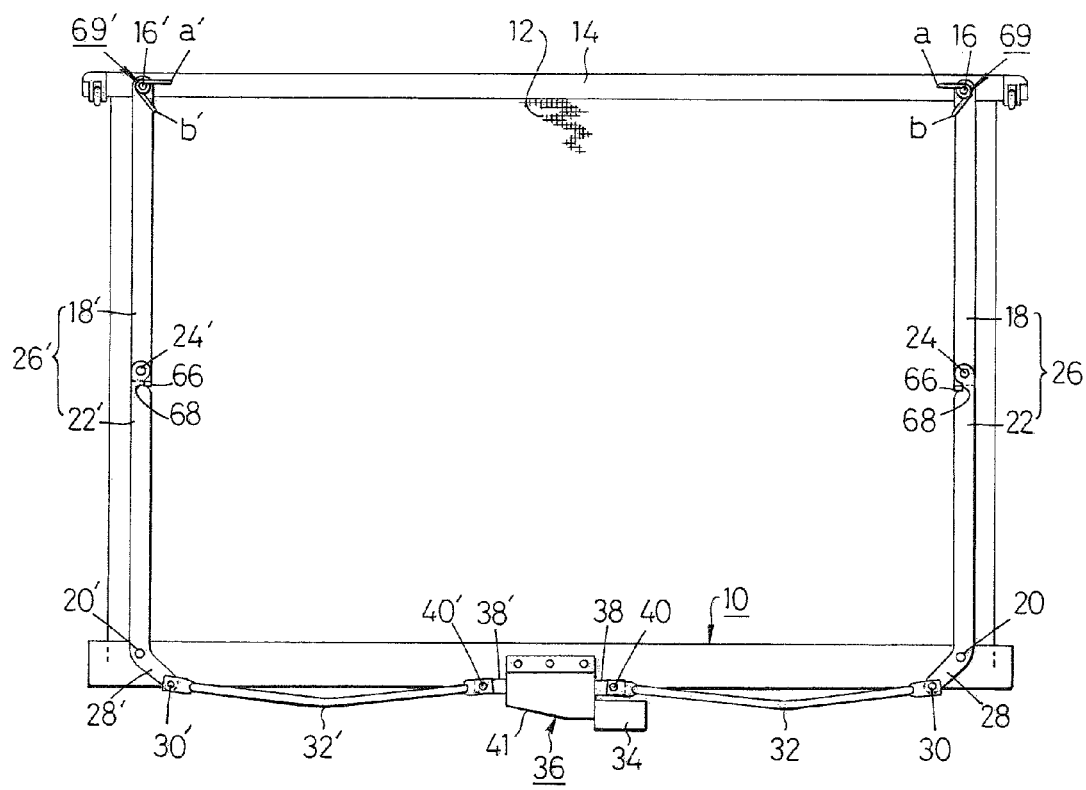
FIG. 1 is a front view illustrating a sunshade apparatus for automobiles according to the present invention, in which arm members are fully stretched so as to extend a sunshade screen.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
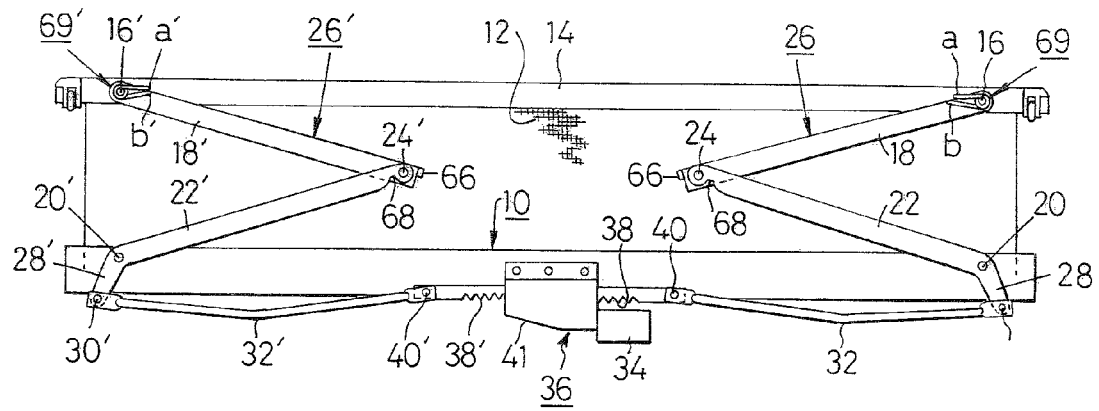
FIG. 2 is a front view illustrating the sunshade apparatus according to the present invention, in which the arm members are closed so as to wind the sunshade screen.

As shown in FIG. 1 and FIG. 2, a sunshade apparatus for automobiles according to the present invention comprises a sunshade screen 12, which is wound around a winding roll (not shown), which is installed inside a casing 10 and biased by an elastic member, such as a biasing spring. The upper edge of the sunshade screen 12 is mounted to a shade bar 14. The sunshade apparatus further comprises a first arm unit 26 and a second arm unit 26', each comprising upper and lower arm members. The upper arm members 18 and 18' of the first and second arm units 26 and 26' are jointed to opposite ends of the shade bar 14 using respective pivots 16 and 16'. The lower arm members 22 and 22' are jointed to opposite ends of the casing 10 using respective pivots 20 and 20'. The upper arm members 18 and 18' are jointed to the lower arm members 22 and 22' using respective hinges 24 and 24', thus forming the first and second arm unit 26 and 26'. First and second linking rods 32 and 32' are jointed at the outer ends thereof to respective extension ends 28 and 28' of the lower arm members 22 and 22' using respective pivots 30 and 30'. A drive unit 36, including a drive motor 34, moves the first and second linking rods 32 and 32' in opposite directions, thus stretching or closing the first and second arm units 26 and 26' and extending or winding the sunshade screen 12. In the sunshade apparatus, first and second racks 38 and 38' are jointed to the inner ends of the first and second linking rods 32 and 32' using respective pivots 40 and 40'. The first and second racks 38 and 38' are movably inserted into a housing 41 of the drive unit 36 such that the racks 38 and 38' can move in opposite directions without interference.

Figure 4:
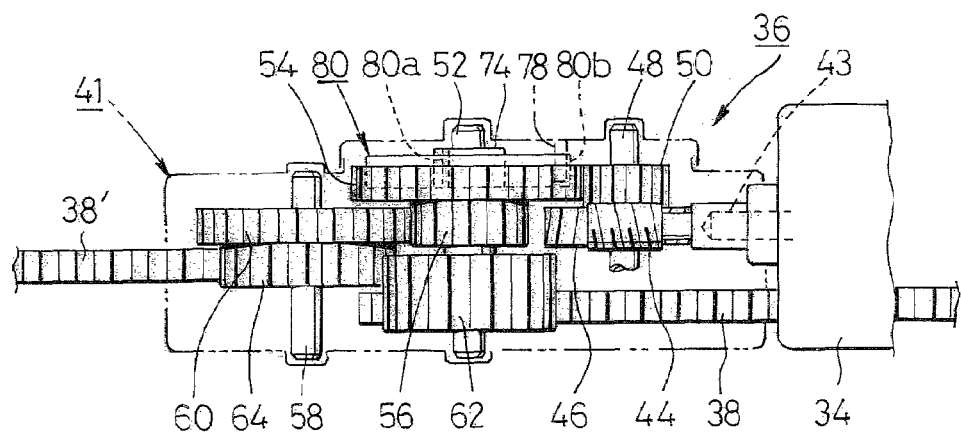
FIG. 4 is a sectional view illustrating an internal construction of a drive unit in the sunshade apparatus according to the present invention.

FIG. 4 illustrates an embodiment of the drive unit 36. As shown in FIG. 4, the drive unit 36 comprises a worm wheel 46, which is engaged with a worm 44 connected to a rotating shaft 43 of the motor 34. In the drive unit 36, a first small-diameter gear 50, which is concentrically mounted to the shaft 48 of the worm wheel 46, is engaged with a first large-diameter gear 54 of a first output shaft 52, thus transmitting the rotating force of the motor 34 to the first output shaft 52 while reducing the rotating speed.

A second small-diameter gear 56 is concentrically mounted to the first output shaft 52 and is engaged with a second large-diameter gear 60 of a second output shaft 58, which is placed adjacent to the first output shaft 52. Thus, the second small-diameter gear 56 transmits the rotating force to the second output shaft 58 while reducing the rotating speed.

A first drive pinion 62 is concentrically mounted to the first output shaft 52 and is engaged with the first rack 38.

The first drive pinion 62 is engaged with a second drive pinion 64 concentrically mounted to the second output shaft 58. The second drive pinion 64 is engaged with the second rack 38'. Thus, the first and second drive pinions 62 and 64 can be rotated in opposite directions at a reduced rotating speed according to the clockwise or counterclockwise rotating motion of the drive motor 34. Further, the first and second racks 38 and 38' are moved in opposite directions by the rotating motions of the first and second drive pinions 62 and 64, thus stretching or closing the first and second arm units 26 and 26'. Here, in the first arm unit 26, the lower arm member 22, which is jointed to the upper arm member 18, is coupled to the first rack 38 through the first linking rod 32. In the same manner, in the second arm unit 26', the lower arm member 22', which is jointed to the upper arm member 18', is coupled to the second rack 38' through the second linking rod 32'.

Figure 3:
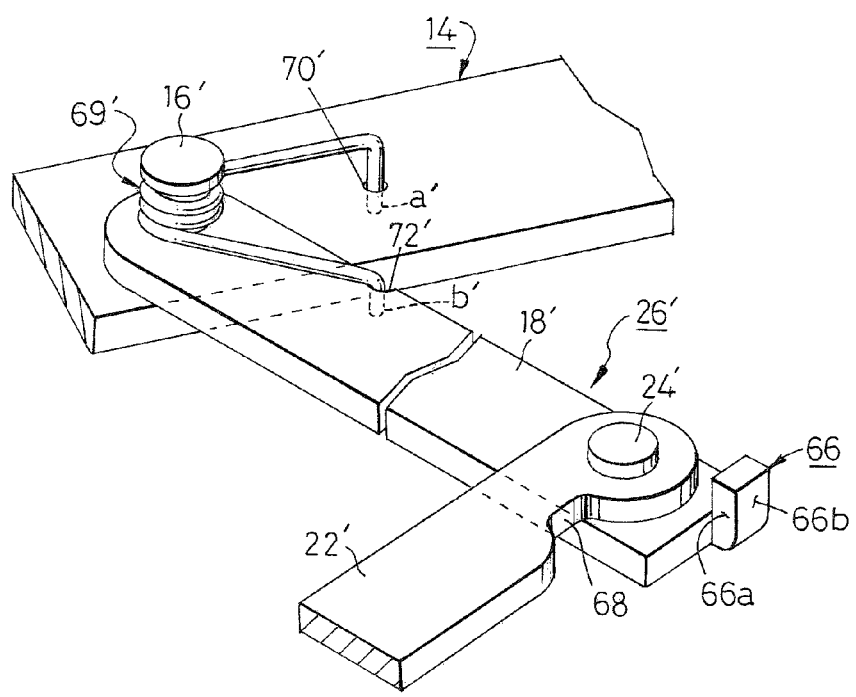
FIG. 3 is an enlarged perspective view illustrating a connection structure provided at joints between a shade bar and arm members in the sunshade apparatus according to the present invention.

FIG. 3 illustrates a stopping means, which prevents excessive rotation of the upper and lower arm members 18' and 22' of the second arm unit 26' when the upper arm member 18' is fully stretched from the lower arm member 22', and a biasing means, which biases the upper arm member 18' so as to promote the rotating motion of the upper arm member 18'. Of course, the first arm unit 26 has a stopping means and a biasing means having the same structures as those of the second arm unit 26', but they are not shown in the drawings.

The lower end of the upper arm member 18 extends downwards over the pivot 24' and is provided with a bent protrusion 66, which comprises a cut surface 66a and a bent surface 66b. The cut surface 66a is formed by cutting a part of the lower end using a press die, while the bent surface 66b is formed by bending the remaining part of the cut lower end upwards.

An engaging groove 68 is formed on a side surface of an end of the lower arm member 22' at a location beneath the pivot 24' so as to be engaged with the cut surface 66a of the bent protrusion 66 of the upper arm member 18'. Thus, when the upper arm members 18 and 18' of the first and second arm units 26 and 26' are fully stretched in vertical directions from respective lower arm members 22 and 22', as shown in FIG. 1, the upper arm members 18 and 18' are prevented from being further rotated around respective pivots 24 and 24'.

In the above state, the bent surface 66b, the bent state of which may be deformed by shock, does not collide with the engaging groove 68 of the lower arm member 22'. Instead, the cut surface 66a, which has a high impact resistance, collides with the engaging groove 68, so that the stopping means can executes its desired stopping function after it is repeatedly used for a lengthy period of time.

Further, the cut surface 66a and the bent surface 66b of the bent protrusion 66 and the engaging groove 68 can be formed through appropriate setting of the press die, so that the stopping means can secure uniform quality, be formed at low cost, and realize improved quality.

As shown in FIGS. 1, 2 and 3, respective torsion springs 69 and 69' for elastically biasing the upper arm members 18 and 18' of the first and second arm units 26 and 26' are securely fitted over the pivots 16 and 16', which connect the upper arm members 18 and 18' to the shade bar 14.

The first ends a and a' of the torsion springs 69 and 69' are locked to respective locking holes 70 and 70' of the shade bar 14, while the second ends b and b' are caught by respective locking grooves 72 and 72' formed on the inner side surfaces of the upper arm members 18 and 18'. Due to the torsion springs 69 and 69', the inwardly folded upper arm members 18 and 18' can be stretched outwards.

In the present invention, the torsion springs 69 and 69' are fitted over respective pivots 16 and 16', which connect the upper arm members 18 and 18' to the shade bar 14. Thus, the torsion springs 69 and 69' can be more easily assembled in the sunshade apparatus, compared with the prior art sunshade device which has one tension spring elongated to exceed the length of the shade bar.

Further, the torsion springs 69 and 69' of the present invention do not generate vibration or noises during operation, unlike the prior art tension spring. The torsion springs 69 and 69' are light, compared to the prior art tension spring, thus reducing the power required to move the shade bar 14 upwards or downwards. Thus, the present invention realizes the smallness of the drive unit 36 and the lightness of the sunshade apparatus.

Figure 5:
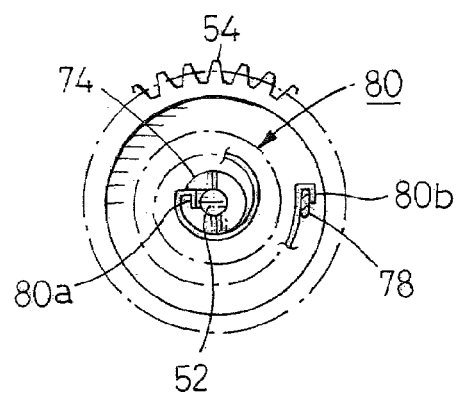
FIG. 5 is a plan view illustrating a middle gear of the drive unit shown in FIG. 4.

As shown in FIGS. 4 and 5, a spiral spring 80 is provided in the drive unit 36 of the present invention such that the innermost end 80a thereof is locked to a boss 74 of the first large-diameter gear 54 of the first output shaft 52 and the outermost end 80b thereof is locked to a protrusion 78, provided on a housing 41 of the drive unit 36.

When the first large-diameter gear 54 is rotated clockwise in FIG. 5 in response to a rotation motion of the motor 34, the spiral spring 80 is turned to become tightened, thus storing power. However, when the first large-diameter gear 54 is rotated counterclockwise in FIG. 5, the tightened spiral spring 80 restores its original state. Therefore, when the sunshade apparatus is operated to extend the sunshade screen 12, the spiral spring 80 can increase the power. When the sunshade apparatus is operated to wind the sunshade screen 12, the spiral spring 80 can prevent quick motions of the shade bar 14, the first arm unit 26 and the second arm unit 26'. Thus, the spiral spring 80 promotes easy extending and smooth winding of the sunshade screen 12.

In the present invention, the first and second arm units 26 and 26' can execute precise motions without undesired play by the first and second racks 38 and 38', which move rectilinearly in opposite directions by the motor 34. Thus, the sunshade apparatus for automobiles of the present invention accomplishes improved operational reliability.

Further, in the present invention, the stopping means, which prevents excessive rotation of the upper arm members 18 and 18' and the lower arm members 22 and 22' of the first and second arm units 26 and 26' when the upper arm members 18 and 18' are fully stretched from respective lower arm members 22 and 22', comprises the cut surface 66a of the bent protrusion 66, which is formed by cutting and bending a part of the lower end of each lower arm member 18, 18' using a press die; and the engaging groove 68, which is formed by cutting a side of the upper end of each lower arm member 22, 22' using a press die. Thus, the stopping means of the present invention can be formed with uniform quality and at low cost, so that it reduces the production cost and realizes improved quality of the sunshade apparatus.

Further, the biasing means of the present invention, which promotes the stretching motions of the first and second arm units 26 and 26', comprises the two torsion springs 69 and 69, which are securely fitted over respective pivots 16 and 16', which connect the upper arm members 18 and 18' of the first and second arm units 26 and 26' to the shade bar 14. Thus, the biasing means of the present invention can be easily assembled in the sunshade apparatus, does not generate vibration or noises during operation, and is light, thereby reducing the power, required to move the shade bar 14 upwards or downwards. Therefore, the biasing means of the present invention realizes the smallness of the drive unit 36 and the lightness of the sunshade apparatus.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sunshade apparatus for automobiles comprising:
a sunshade screen wound around a winding roll, the winding roll being installed inside a casing and being biased by an elastic member;
a shade bar holding an edge of the sunshade screen;
a first arm unit and a second arm unit, each comprising upper and lower arm members, the upper arm members of the first and second arm units being jointed to opposite ends of the shade bar using respective pivots, and the lower arm members being jointed to opposite ends of the casing using respective pivots and being jointed to the upper arm members using respective hinges;
first and second linking rods jointed at first ends thereof to respective extension ends of the lower arm members using respective pivots; and
a drive unit including a drive motor and moving the first and second linking rods in opposite directions, thus stretching or closing the first and second arm units and extending or winding the sunshade screen, wherein
first and second racks are jointed to second ends of the first and second linking rods using respective pivots, and are movably inserted into a housing of the drive unit such that the racks can move in opposite directions without interference;
the drive unit comprises: a small-diameter gear mounted to a shaft of a worm wheel engaged with a worm of a rotating shaft of the motor, and engaged with a large-diameter gear of a first output shaft; a first drive pinion mounted to the first output shaft and engaged with the first rack; and a second drive pinion mounted to a second output shaft and engaged both with the first drive pinion and with the second rack; and
torsion springs are fitted over respective pivots, which joint the upper arm members of the first and second arm units to the shade bar, first ends of the torsion springs being locked to respective locking holes of the shade bar, and second ends of the torsion springs being caught by respective locking grooves of the upper arm members, so that the torsion springs can bias and stretch respective upper arm members outwards.

2. The sunshade apparatus for automobiles as set forth in claim 1, further comprising:
a bent protrusion provided on a lower end of the upper arm member of each of the first and second arm units and comprising a cut surface and a bent surface; and
an engaging groove formed on a side of an upper end of the lower arm member of each of the first and second arm units such that the engaging groove can be engaged with the cut surface of the bent protrusion, thus preventing excessive rotation of the upper and lower arm members when the first and second arm units are fully stretched.

* * * * *